Dec. 12, 1933.                F. W. STEERE                1,939,470
                    APPARATUS FOR PRODUCING COMBUSTIBLE GAS
                        Filed April 20, 1928        2 Sheets-Sheet 1

FRANK W. STEERE
INVENTOR

ATTORNEY

Dec. 12, 1933.   F. W. STEERE   1,939,470
APPARATUS FOR PRODUCING COMBUSTIBLE GAS
Filed April 20, 1928   2 Sheets-Sheet 2
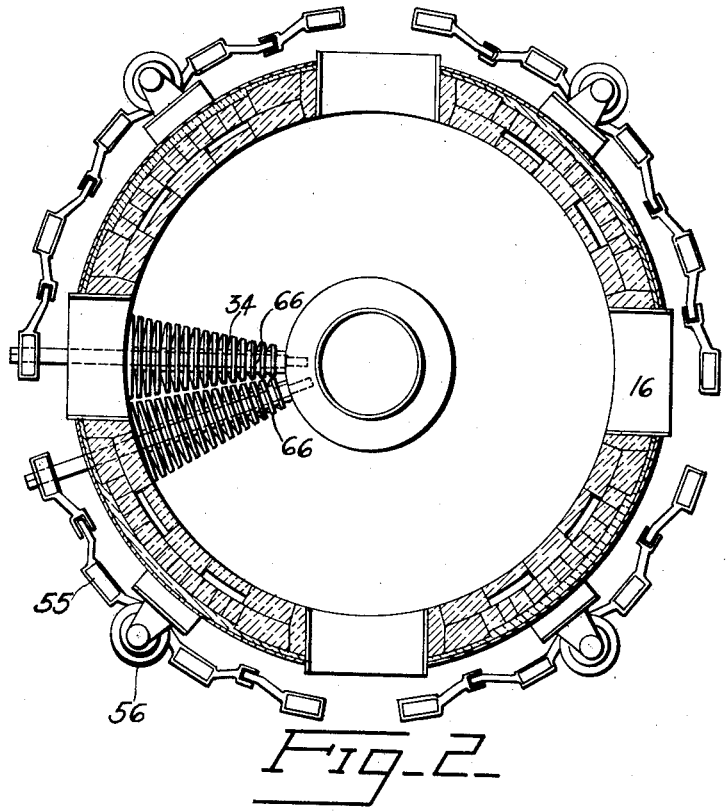
Fig_2_
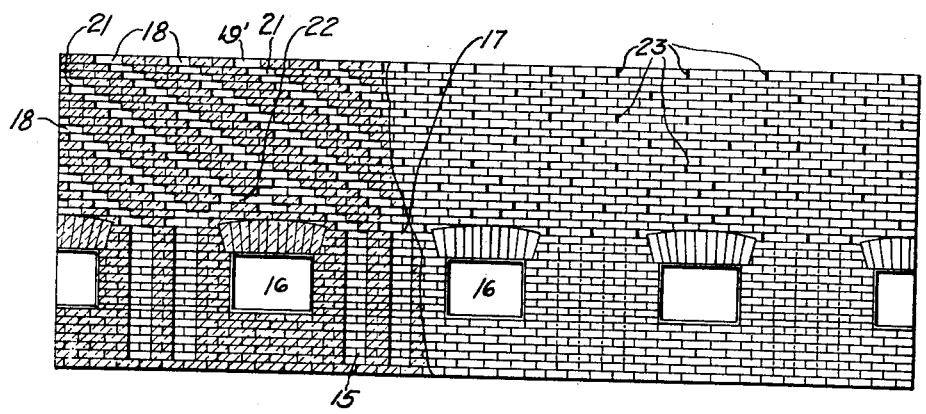
Fig_3_
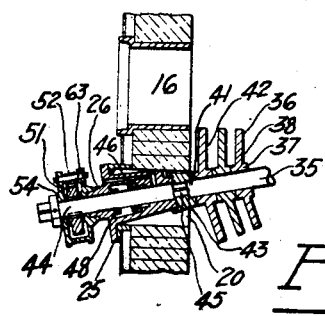
Fig_4_
FRANK W. STEERE
INVENTOR
BY *[signature]*
ATTORNEY Patented Dec. 12, 1933

1,939,470

UNITED STATES PATENT OFFICE 1,939,470

APPARATUS FOR PRODUCING COMBUSTIBLE GAS

Frank W. Steere, Scarsdale, N. Y., assignor to Semet-Solvay Engineering Corporation, New York, N. Y., a corporation of New York Application April 20, 1928. Serial No. 271,465

8 Claims. (Cl. 48—64)

This invention relates to a process and apparatus for producing combustible gas, and more particularly to a process and apparatus for producing combustible gas in a gas generator wherein clinker formation on the side wall of the generator is retarded and substantially reduced and means are provided for breaking up and removing the clinker and ash formed in the fuel bed. Although I have shown and described herein as an embodiment of my invention a generator for water gas manufacture, it will be understood that this invention is not limited thereto but may be used in connection with other gas generating devices, as for example in producer gas operation.

It has been found, in the usual operation of water gas generators, that clinker builds up contiguous to and along the side walls of the generator frequently forming a hard solid cake on the walls of the machine. In addition to the side wall clinker, there usually is a gradual formation of clinker throughout the fuel bed. It is therefore necessary at more or less frequent intervals to remove ash and clinkers from the fuel bed. In the case of clinkers, this is done by manually removing them from the bed by means of a suitable tool. Immediately after clinkering the fuel bed is of substantially uniform density but during the subsequent operations clinkers gradually build up along the walls and in the fuel bed until it is necessary to again remove them. Due to this gradual formation of clinkers the density of the fuel bed varies, thereby altering the conditions of gas manufacture and rendering the accurate control of the gas-make difficult. Further, this periodic clinkering, in addition to the arduous task involved, necessitates the discontinuance of the gas making operation thus effectively decreasing the capacity of the set.

One object of the present invention is to simplify the operation of gas generating devices by providing continuously operative and automatic means, as distinguished from manual means, for retarding and preventing the formation of clinkers along the walls of the generator, and for removing ash and clinker from the fuel bed, thereby maintaining substantially uniform fuel bed conditions and a fuel bed of uniform density. The provision of automatic means for removing ash and clinkers, and retarding the formation of clinkers on the side walls of the generator, increases the life of the refractory lining for the gas generator and eliminates the necessity for periodically discontinuing the gas making operation to remove clinkers, thus permitting continuous and automatic operation and thereby increasing the efficiency and capacity of the gas making set.

According to a preferred embodiment of the present invention, there is provided a refractory lining for the generator having flues therein, the flues extending from the ash pit of the generator along the side walls thereof and being in communication with the ash pit and with the fuel bed. The generator has therein a grate for supporting the fuel bed which comprises members mounted about the longitudinal axis of the cylindrical casing in the generator to provide a circular opening through which a poker member is adapted to be moved into the fuel bed and retracted therefrom. Preferably, the structure of the grate and poker member is of the type disclosed in my co-pending application filed November 15, 1927, Ser. No. 233,471. During the blasting and gas making operation the air and/or steam introduced into the ash pit passes through the grate to the fuel bed and also into and through these flues into the fuel bed. The steam and/or air in passing through the flues in the lining into the fuel bed act as a cooling medium for the generator lining, and thereby retard and prevent the formation of clinkers on the generator lining. The flues communicate with the fuel bed of the generator at spaced points on the interior circumferential surface of the lining so that the air and/or steam emerging from the flues provide a multiplicity of jets which augment the action of the cooling medium in retarding and preventing the formation of clinkers on the lining of the generator. The grate and poker member are operated to continuously agitate the fuel bed and automatically and continuously remove the ash and clinker therefrom.

This invention comprises a combustible gas generating device having, in combination, a gas cooled lining for the generator to retard clinker formation on the lining thereof and a movable grate in the generator adapted to agitate the fuel bed and remove ash and clinkers formed therein.

Other objects and advantages will appear from the following detailed description taken in connection with the accompanying drawings, in which:

Fig. 2 is a sectional plan view, partly in elevation, taken on the line 2—2 of Fig. 1;

Figure 1:
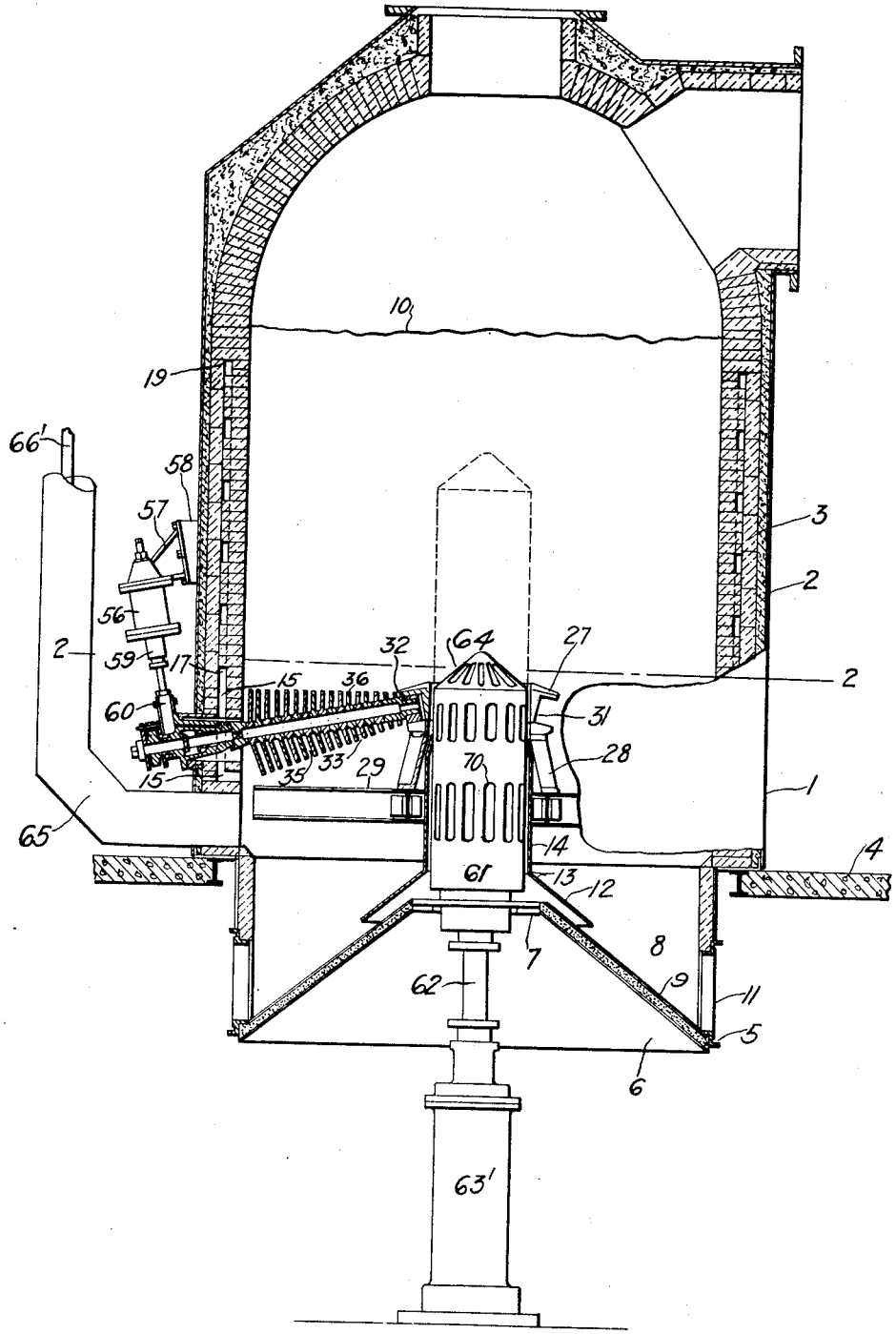
Fig. 1 shows a preferred embodiment of the invention applied to a gas generator. This figure shows a vertical side elevation, partly in section and partly broken away, to show the construction of the grate, poker member, and the operating mechanism therefor.

Fig. 3 is a vertical longitudinal view of the portion of the lining formed with flues as that portion would appear if positioned in a vertical plane, the right-hand side of this figure showing the lining contiguous to the fuel bed and the left-hand side being broken away to show the arrangement of flues in the lining; and Fig. 4 is a fragmentary sectional detail, a portion of the grate being depicted in elevation, showing the mounting for a section of the grate.

In the preferred embodiment of the invention illustrated on the drawings, 1 indicates a cylindrical shell or casing of a water gas generator lined with suitable heat insulating material 2, and provided with a refractory lining 3. The generator is supported on a cement or other suitable base 4, and preferably extends below the base 4, the lower extremity 5 being connected by an inverted truncated conical plate 6, with a ring 7 forming an ash pit 8. The plate 6 is also provided with a refractory lining 9. Doors 11 are positioned in the ash pit and whenever desired may be opened and the ash pit cleaned. An inverted truncated conical member 12 is positioned over the ring 7 and has extending from the upper portion 13 a sleeve member 14. Member 12 prevents the discharge of ash or other material through the ring 7.

The refractory lining 3 for the generator is preferably composed of firebrick and is so constructed that a pair of vertical flues 15 are positioned between the adjacent clinker door openings 16, extending at regularly spaced positions through the lining 3, the base portions of the flues 15 communicating with the ash pit 8. The vertical flues 15 terminate at 17 slightly above the openings 16, and have extending therefrom oblique flues 18 which terminate at points 19 below but preferably near the top 10 of the fuel bed. Oblique flues 21 are formed substantially parallel to the flues 18 and extend from above the openings 16 to points 19' similarly located below the top of the fuel bed. Flues or connecting passages 22 also formed in the lining connect the flues 21 with the upper ends 17 of the vertical flues 15. The flues 18, 21 and 22 communicate at spaced points 23 on the interior circumferential surface of the lining with the fuel bed of the generator.

Openings 20 spaced about the circumferential surface of the generator extend through the heat insulating lining 2 and the casing 1 and have mounted therein castings 25 (Fig. 4) which are provided with cylindrical bearings 26. Mounted preferably co-axially with the longitudinal axis of the casing 1 is an open casting 27 bolted or otherwise secured to an inclined casting 28 resting on I beams 29 which serve to support casting 28 in fixed position. The casting 27 is positioned on casting 28 to form bearing surfaces 31 at regularly spaced points around the outer periphery of these castings.

Rotatably mounted in the bearing surfaces 31 are the bearing pins 32 integral with or secured to the vertices of the truncated conical roll sections 33 of the grate 34. Each conical roll section comprises a rectangular or flattened shaft 35 which has slidably mounted thereon preferably at regular spaced positions polygonal plates or discs 36, provided with circular thickened portions 37. These discs are dished as indicated at 38 and are of gradually diminishing surface area, the plate of greatest area being positioned at the end 41 of shaft 35, adjacent the interior periphery of the shell or casing 1, while the disc with the smallest surface area is positioned adjacent the casting 27. This construction provides a grate section having the general configuration of a conical roll provided with a plurality of annular slots or recesses 42.

Bearing members 43 are rotatably positioned in openings 20 contiguous with the casting 25. The flattened shafts 35 are mounted in the bearing members 43 and are preferably welded thereto. Shafts or rods 44 are rotatably mounted in the casting 25 and have the ends 45 flattened or rectangular in form and in driving engagement with the rectangular opening of the bearing members 43. Suitable packing and glands 46 are positioned on shafts 44 to provide a dust-proof bearing support for the shafts 44 and collars 48 are keyed or otherwise secured to the shafts 44 to maintain this structure in operative relation. Shafts 44 extend exteriorly of the casing 1 and keyed or otherwise secured to the shafts 44 are ratchets 51 which are in driving engagement with pawls 52 pivotally mounted on pins 63 passing through disc-shaped portions 54 of toggle levers 55.

Hydraulic cylinders or motors 56 are preferably secured to the exterior of the casing 1 by bracket arms 57 (Fig. 1) bolted or otherwise secured to standards 58. Piston rods 59 of the hydraulic cylinders are directly or indirectly connected by links 60 with the toggle levers 55 so that back and forth movement of the piston rods oscillates the toggle levers and thereby intermittently rotates the conical roll sections. It is understood that the mechanism described herein, for moving the conical roll section of the grate is merely for purposes of illustration and that any desired drive may be employed to move the grate section.

Positioned partly within the ash pit 8 is a vertically reciprocating cylindrical hollow poker member 61 provided with openings 70, the longitudinal axis of which is in alignment with the longitudinal axis of the casing or shell 1. The collar or sleeve member 14 is co-axially positioned relative to the poker member and serves to guide the poker member and also prevent the discharge of ashes and other material through the annular opening between the outer periphery of the poker member and the interior of the casting 27. The poker member 61 is connected to a piston rod 62 of a hydraulic motor or cylinder 63 positioned below the ash pit 8 and is moved by the hydraulic cylinder 63' back and forth from the full line position in Fig. 1 to the dotted line position. This poker member is preferably positioned so that when in lowered or full line position (Fig. 1) the tip 64 of the poker extends through the cylindrical portion of the casting into the fuel bed.

Leading to the base of the generator, preferably below the grate into the ash pit 8 is a blast pipe 65 for supplying air or other oxygen containing gases during the blasting cycle. A steam pipe or jet 66 extends into the air blast pipe 65 and is used to supply steam for making gas during the uprun. It is understood, of course, that the showing of steam and air pipes is merely illustrative in character and that the steam and/or air may be supplied in any desired manner to any desired portion of the generator but preferably it is supplied to the ash pit of the generator.

In operation the piston rods 59 of the hydraulic cylinders 56 are reciprocated at regular intervals by the admission and discharge of a suitable pressure fluid into and through the hydraulic cylinders thereby oscillating the links 60 and advancing the pawls 52 which are in engagement with the teeth of the ratchets 51 thereby rotating the ratchets and intermittently rotating the shafts 44 of the conical roll sections 33 in driving engagement therewith. The adjacent conical roll sections 33 of the grate are mounted so that the disc members 36 are positioned with the flat peripheral edges 66 of the discs of one section in crushing relation with the edges of the discs of the other section.

The poker 61 is automatically reciprocated at regular intervals by the admission and discharge of a suitable pressure fluid into and through the hydraulic cylinder 63' thus keeping the center of the fuel bed open forcing clinkers that may have formed in the fuel bed outward toward the shell or casing and preventing the formation of large clinker masses. The rotating conical roll sections 33 catch and grind any clinkers that may be present in the ash and cause the clinker and ash to travel between the rolls and through the recesses 42 into the ash pit.

During the blasting cycle, air or other oxygen containing gases is introduced through the pipe 65 into the ash pit and a portion of the gas passes therefrom through the grate into the fuel bed into the poker member 61 and through the openings 70 into the fuel bed, the remaining gas passing into the vertical flues 15 and thence into the diagonal or oblique flues 18, 21 and 22 emerging therefrom through openings 23 into the sides of the fuel bed. During the gas making cycle steam or other gas making fluid introduced through pipe 66' enters the ash pit and similarly passes through the grate and through the flues 15 into the base of the fuel bed and side portions thereof. Thus the fluid passing through the flues into the fuel bed serves to cool the generator lining and also there are formed jets of steam and/or air emerging at spaced points on the interior circumferential surface of the lining which augment the action of the cooling medium for the lining to retard and prevent the formation of clinkers on the walls thereof. Also the fluid passing through and thereby cooling the lining and emerging therefrom into the fuel bed tends to prevent the firm adherence to the lining of the sidewall clinker that is formed in the generator so that the agitation of the fuel bed by the poker and grate is sufficient to cause the side wall clinker to gradually settle on the grate which crushes and removes it from the fuel bed.

As above pointed out the poker and grate act to effectually remove clinker formed in the fuel bed. The combined action of the gas cooled lining and the grate and poker construction is to retard the formation of clinkers on the walls of the generator and to remove clinkers formed in the fuel bed so that a fuel bed of uniform density is obtained.

It will be noted that the conical rolls converge from the inner periphery of the casing towards the longitudinal axis thereof and are arranged to define preferably a circular opening having its center on the longitudinal axis of the casing. The poker member preferably has its longitudinal axis in alignment with the longitudinal axis of the casing and is adapted to be moved through this circular opening, its dimensions being such that there is a small clearance between the surface of the poker member and the opening in the casting wherein the conical rolls are supported. While the poker member is shown cylindrical in contour and a circular opening is shown in the casting 27, it will be understood that this construction and design of poker member and casting is merely a preferred embodiment and that the opening in the casting and the cross-sectional contour of the poker member may be of any desired configuration.

Further, this invention provides efficient means for retarding and preventing the formation of clinkers on the walls of the lining and for automatically and continuously removing any ash and clinker formed in the fuel bed, thereby eliminating the necessity for discontinuing the gas making operation to remove clinker from the fuel bed and enabling a continuous operation with consequent increase in the capacity of the set. The elimination of the necessity for manually removing clinkers serves to increase the effective life of the lining for the generator, as it prevents destruction of the lining by the tools heretofore used in removing clinkers therefrom. The removal of clinkers and ash and gentle agitation of the fuel bed provides a fuel bed of relatively uniform density, thereby maintaining more uniform fuel bed conditions throughout the operation of the generator and increasing the thermal efficiency of the gas-making apparatus.

When in the specification and claims reference is made to the introduction of "steam and air" into the poker member or into the fuel bed, it will be understood that the steam and air are not necessarily introduced at one and the same time, but that air and/or steam may be introduced depending upon the particular method employed for operating the gas generator and on the particular type of combustible gas which it is desired to make.

While I have shown and described as a preferred embodiment of my invention a process and apparatus wherein the air and/or steam from a single source is admitted simultaneously through the grate, poker and lining to the fuel bed, it is understood of course that the invention is not limited thereto and that the fluid passing through the lining may be supplied from one source and the fluid passing through the grate and poker from another source, and that one fluid may be passed through the lining into the fuel bed of the generator while a different fluid is passed through the grate into the fuel bed. Also, my invention includes the passage of the gas-making fluid through the flues of the lining during only a portion of the cycle of operation of the generator and while preferably the gas-making fluid is admitted into the ash pit below the grate and passes therefrom into the flues of the lining and thence into the fuel bed, it may be introduced directly to the flues of the lining and passed into the fuel bed, or may be passed in a reverse direction through the flues or only the cooling effect of the fluid passing through the lining may be utilized and the fluid not introduced into the fuel bed.

It will of course be understood that while a specific embodiment of the invention has been shown and described, various changes in the details thereof may be made by those skilled in the art and the invention is not to be limited to the structure described but only by the scope of the appended claims.

I claim:

1. In a combustible gas generator, a grate for supporting a fuel bed within said generator, said grate comprising members positioned around the inner periphery of the generator and converging towards the longitudinal axis thereof, and a refractory lining having flues therein for said generator, said flues communicating with said fuel bed and with the portion of said generator beneath said grate.

2. In a combustible gas generator, a movable grate in said generator adapted to support a fuel bed and a refractory lining for said generator having flues therein, said flues comprising vertical portions extending from below to above the grate and oblique portions extending from the top end of the vertical portions, the oblique portions of the flues communicating with the fuel bed and the vertical portions communicating with the generator below said grate.

3. In a gas generator, an ash pit provided with cleanout door openings, a refractory lining for said generator having flues therein, said flues comprising vertical portions disposed in pairs between adjacent openings, and oblique portions extending from the top end of said vertical portions through the lining to substantially the top of the fuel bed and from above the openings through the lining to substantially the top of the fuel bed, said oblique portions of the flues extending from the top ends of the vertical portions on opposite sides of each opening and said oblique portions extending from above the openings being connected by a passage extending at a slant in a direction opposite to said oblique portions, said oblique portions and said passage being in communication with the fuel bed and the base of said vertical portions being in communication with said ash pit and means for admitting air and steam into said ash pit.

4. In a combustible gas generator, a poker member, a grate arranged to support a fuel bed and comprising a plurality of members positioned radially of said poker member, means for moving said poker member and said grate members, and a gas cooled lining for said generator.

5. In a gas generator, a grate for supporting a fuel bed within said generator, said grate comprising members positioned around the inner periphery of said casing converging towards the longitudinal axis thereof and arranged to provide an opening, a poker member adapted to be moved through said opening, and a gas cooled lining for said generator to substantially reduce clinker formation on the walls of said casing surrounding said fuel bed.

6. In a gas generator, a cylindrical casing having a fuel bed therein, a gas cooled refractory lining for said casing to substantially reduce clinker formation on the walls of said casing surrounding said fuel bed, a grate comprising members having slots therein positioned around the inner periphery of said casing converging towards the longitudinal axis thereof, arranged to provide a plane surface for supporting said fuel bed and to provide a circular opening having its center on said longitudinal axis, a cylindrical poker member, and means for moving said poker member and said grate members to remove ash and clinkers from said fuel bed.

7. In a water gas generating device, a casing having a fuel bed therein, a grate comprising members positioned radially with respect to the longitudinal axis of said casing, said members arranged to provide an opening, a poker member adapted to be moved through said opening, a refractory lining for said casing having flues therein, said flues comprising vertical portions extending from below to above the grate and oblique portions extending from the top end of the vertical portions, the oblique portions of said flues communicating with the fuel bed and the vertical portions communicating with the generator below said grate, and means for moving said poker member and said grate members.

8. In a water gas generator having a cylindrical casing, bearing members in said casing, an open cylindrical bearing member having the longitudinal axis thereof in alignment with the longitudinal axis of said casing, a grate comprising truncated conical roll sections, said sections having a shaft and polygonal shaped dished discs mounted thereon at regularly spaced positions to form slots in said roll sections, the vertices of said conical roll sections being provided with bearing portions rotatably mounted in the outer surface of said open cylindrical bearing member and said shafts being rotatably positioned and extending through said bearing members in said casing, a poker member adapted to be moved through said open bearing member and a refractory lining for said casing having flues therein, said flues comprising vertical portions extending from below to above the grate and oblique portions extending from the top end of the vertical portions, the oblique portions of the flues communicating with the fuel bed and the vertical portions communicating with the generator below said grate, and means for moving said conical roll sections and said poker member to remove ash and clinkers from said fuel bed.

FRANK W. STEERE.